United States Patent
Bobbitt et al.

(10) Patent No.: US 8,429,016 B2
(45) Date of Patent: Apr. 23, 2013

(54) GENERATING AN ALERT BASED ON ABSENCE OF A GIVEN PERSON IN A TRANSACTION

(75) Inventors: Russell Patrick Bobbitt, Pleasantville, NY (US); Quanfu Fan, Somerville, MA (US); Arun Hampapur, Norwalk, CT (US); Frederik Kjeldsen, Poughkeepsie, NY (US); Sharathchandra Umapathirao Pankanti, Darien, CT (US); Akira Yanagawa, New York, NY (US); Yun Zhai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 12/262,454

(22) Filed: Oct. 31, 2008

(65) Prior Publication Data
US 2010/0114746 A1 May 6, 2010

(51) Int. Cl.
*G06Q 20/00* (2006.01)
(52) U.S. Cl.
USPC .............................................. 705/16; 705/18
(58) Field of Classification Search .................. None
See application file for complete search history.

(56) References Cited

U.S. PATENT DOCUMENTS

| | | | |
|---|---|---|---|
| 4,679,077 A | 7/1987 | Yuasa et al. | |
| 4,701,849 A | 10/1987 | Elden | |
| 4,991,008 A | 2/1991 | Nama | |
| 5,099,322 A | 3/1992 | Gove | |
| 5,729,471 A | 3/1998 | Jain et al. | |
| 5,745,036 A | 4/1998 | Clare | |
| 5,748,085 A | 5/1998 | Davis et al. | |
| 5,920,338 A | 7/1999 | Katz | |
| 5,965,861 A | 10/1999 | Addy et al. | |
| 6,075,560 A | 6/2000 | Katz | |
| 6,154,149 A | 11/2000 | Tyckowski et al. | |
| 6,236,736 B1 | 5/2001 | Crabtree et al. | |
| 6,259,803 B1 | 7/2001 | Wirtz et al. | |
| 6,424,370 B1 | 7/2002 | Courtney | |
| 6,462,774 B1 | 10/2002 | Bildstein | |

(Continued)

FOREIGN PATENT DOCUMENTS

| WO | 2005102175 | 11/2005 |
|---|---|---|
| WO | WO 2006/105376 A2 | 10/2006 |
| WO | WO 2008/008505 | 1/2008 |
| WO | WO 2008/083869 A1 | 7/2008 |

OTHER PUBLICATIONS

Office Action dated Sep. 29, 2010 for U.S Appl. No. 12/262,458, filed Oct. 31, 2008, titled, Using Detailed Process Information at a Point of Sale, pp. 1-11.

(Continued)

*Primary Examiner* — F. Zeender
*Assistant Examiner* — Christopher Buchanan
(74) *Attorney, Agent, or Firm* — Ryan, Mason & Lewis, LLP

(57) ABSTRACT

Techniques for generating an alert based on absence of a given person in a transaction are provided. The techniques include monitoring, via video, a transaction, wherein the transaction includes presence of a given person in the transaction, relating the video of the transaction to a corresponding portion of a transaction log (TLOG), using the video and corresponding portion of the TLOG to detect if the given person in the transaction is present, and generating an alert if the given person is not present at the transaction.

25 Claims, 5 Drawing Sheets

U.S. PATENT DOCUMENTS

| | | |
|---|---|---|
| 6,463,432 B1 | 10/2002 | Murakawa |
| 6,636,635 B2 | 10/2003 | Matsugu |
| 6,793,128 B2 | 9/2004 | Huffman |
| 6,847,393 B2 | 1/2005 | Ashe et al. |
| 6,871,185 B2 | 3/2005 | Walker et al. |
| 6,970,810 B1 | 11/2005 | Matsko |
| 6,998,987 B2 | 2/2006 | Lin |
| 7,004,382 B2 | 2/2006 | Sandru |
| 7,028,269 B1 | 4/2006 | Cohen-Solai et al. |
| 7,080,778 B1 | 7/2006 | Kressin et al. |
| 7,100,824 B2 | 9/2006 | Ostrowski et al. |
| 7,130,468 B1 | 10/2006 | Meyer et al. |
| 7,246,745 B2 | 7/2007 | Hudnut et al. |
| 7,295,942 B2 | 11/2007 | Joublin et al. |
| 7,319,479 B1 | 1/2008 | Crabtree et al. |
| 7,328,844 B2 * | 2/2008 | Workens .................. 235/451 |
| 7,448,542 B1 | 11/2008 | Bobbitt et al. |
| 7,503,490 B1 | 3/2009 | Bobbitt et al. |
| 7,548,253 B2 | 6/2009 | Kang |
| 7,562,817 B2 | 7/2009 | McQueen et al. |
| 7,631,808 B2 | 12/2009 | Kundu et al. |
| 7,646,745 B2 | 1/2010 | Caldwell et al. |
| 7,688,349 B2 | 3/2010 | Flickner et al. |
| 7,733,375 B2 | 6/2010 | Mahowald |
| 7,751,647 B2 | 7/2010 | Pikaz |
| 7,817,914 B2 | 10/2010 | Kuberka et al. |
| 7,822,252 B2 | 10/2010 | Bi et al. |
| 7,957,565 B1 | 6/2011 | Sharma et al. |
| 8,019,170 B2 | 9/2011 | Wang et al. |
| 2002/0044691 A1 | 4/2002 | Matsugu |
| 2003/0107649 A1 | 6/2003 | Flickner et al. |
| 2003/0174869 A1 | 9/2003 | Suarez |
| 2004/0010328 A1 | 1/2004 | Carson et al. |
| 2004/0064372 A1 | 4/2004 | Freeny, Jr. |
| 2004/0066966 A1 | 4/2004 | Schneiderman |
| 2004/0066970 A1 | 4/2004 | Matsugu |
| 2004/0095477 A1 | 5/2004 | Maki et al. |
| 2005/0141765 A1 | 6/2005 | Liang et al. |
| 2005/0146605 A1 | 7/2005 | Lipton et al. |
| 2005/0162515 A1 | 7/2005 | Venetianer et al. |
| 2005/0162540 A1 | 7/2005 | Yata |
| 2005/0265582 A1 | 12/2005 | Buehler et al. |
| 2006/0072010 A1 | 4/2006 | Haering et al. |
| 2006/0095317 A1 | 5/2006 | Brown et al. |
| 2006/0104479 A1 | 5/2006 | Bonch-Osmolovskiy et al. |
| 2006/0243798 A1 | 11/2006 | Kundu et al. |
| 2006/0251324 A1 | 11/2006 | Bachmann et al. |
| 2007/0036395 A1 * | 2/2007 | Okun .................. 382/115 |
| 2007/0043608 A1 | 2/2007 | May et al. |
| 2007/0076957 A1 | 4/2007 | Wang et al. |
| 2007/0174214 A1 * | 7/2007 | Welsh et al. .................. 705/405 |
| 2007/0236570 A1 | 10/2007 | Sun et al. |
| 2007/0272734 A1 | 11/2007 | Lipton et al. |
| 2007/0279494 A1 | 12/2007 | Aman et al. |
| 2008/0100704 A1 * | 5/2008 | Venetianer et al. ........... 348/143 |
| 2008/0122926 A1 | 5/2008 | Zhou et al. |
| 2008/0136910 A1 | 6/2008 | Berkey et al. |
| 2008/0152232 A1 | 6/2008 | Skans |
| 2008/0198225 A1 | 8/2008 | Gal et al. |
| 2009/0040303 A1 | 2/2009 | Finn et al. |
| 2009/0222354 A1 | 9/2009 | Murphy et al. |
| 2009/0290802 A1 | 11/2009 | Hua et al. |

OTHER PUBLICATIONS

Notice of Allowance dated Feb. 7, 2011 for U.S. Appl. No. 12/262,458, filed Oct. 31, 2008, titled, Using Detailed Process Information at a Point of Sale, pp. 1-6.

Harasse et al., Automated Camera Dysfunction Detection, 2004, retrieved from http://ieeexplore.ieee.org/stamp/stamp.jsp?tp=&arnumber=1300940 pp. 1-5.

* cited by examiner

GENERATING AN ALERT BASED ON ABSENCE OF A GIVEN PERSON IN A TRANSACTION

CROSS-REFERENCE TO RELATED APPLICATIONS

The present application is related to U.S. patent application entitled "Automatically Calibrating Regions of Interest for Video Surveillance," identified by Ser. No. 12/262,446, and filed concurrently herewith, the disclosure of which is incorporated by reference herein in its entirety.

Additionally, the present application is related to U.S. patent application entitled "Using Detailed Process Information at a Point of Sale," identified by Ser. No. 12/262,458, and filed concurrently herewith, the disclosure of which is incorporated by reference herein in its entirety.

The present application is also related to U.S. patent application entitled "Creating a Training Tool," identified by Ser. No. 12/262,467, and filed concurrently herewith, the disclosure of which is incorporated by reference herein in its entirety.

FIELD OF THE INVENTION

The present invention generally relates to information technology, and, more particularly, to retail loss prevention.

BACKGROUND OF THE INVENTION

In a retail checkout station, there are particular types of actions that result in access to the cash register. These actions include, for example, transaction void, item void, item refund, and manager override. With a transaction void, the entire transaction is cancelled, either due to an error or because the customer decided not to purchase items at the point of sale. With an item void, a single item is voided from the transaction due to similar reasons.

Also, with an item refund, a customer returns to the store and a refund is issued for an item. Further, with a manager override, a manager overrides the normal register function resulting in special privileges, such as opening the cash drawer.

All of the above actions, however, can be exploited to commit fraud. As such, a fraudulent action can be determined based on visual analysis of the regions occupied by customers and cashiers. For example, for a transaction void, item void, and item refund, a customer should always be present. For a manager override, there should be two people present in the cashier area, and an override occurring when a single person is present is an indication that fraud might be occurring.

As such, certain types of (for example, checkout) transactions require certain employees and/or customers with specific authority, and detecting such transactions without visual detection of these authorized persons raises suspicion of the transaction. Also, as the number of lanes to monitor increases, examining all of these events becomes disadvantageously time-consuming.

SUMMARY OF THE INVENTION

Principles of the present invention provide techniques for generating an alert based on absence of a given person in a transaction. An exemplary method (which may be computer-implemented) for generating an alert based on absence of a given person in a transaction, according to one aspect of the invention, can include steps of monitoring, via video, a transaction, wherein the transaction includes presence of a given person in the transaction, relating the video of the transaction to a corresponding portion of a transaction log (TLOG), using the video and corresponding portion of the TLOG to detect if the given person in the transaction is present, and generating an alert if the given person is not present at the transaction.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus or system including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention include generating alerts and/or annotations based on absence of given persons (for example, required persons) authorizing certain types of transactions (for example, in a retail checkout situation). One or more embodiments of the invention relate (for example, automatically) video of a transaction to the corresponding portion of the transaction log and, using video camera analysis, detect if the required authorized people are present and create annotation accordingly. As such, the techniques described herein use a camera to see if the customer, cashier, and/or manager are present as required for actions (for example, voids, refunds, overrides, etc.), as prescribed by an enterprise policy.

As described herein, one or more embodiments of the invention can include a system using a checkout area, wherein the checkout area is monitored by video camera and a checkout transaction log instrumented to capture a description of events. One or more embodiments of the present invention also include the use of a model of checkout model events, a visual analytic engine analyzing video of the checkout, a visual analytic engine detecting persons in the checkout area, a visual analytic engine categorizing the persons as shopper, cashier, and/or manager, and a system relating the visual events with the transaction log events. As such, with the use of such elements, one or more embodiments of the invention can generate (automatically) an alert and/or annotation to the TLOG if the required authorized person is not available at the transaction (for example, an override, void or refund) as required by the enterprise policy.

Figure 1:
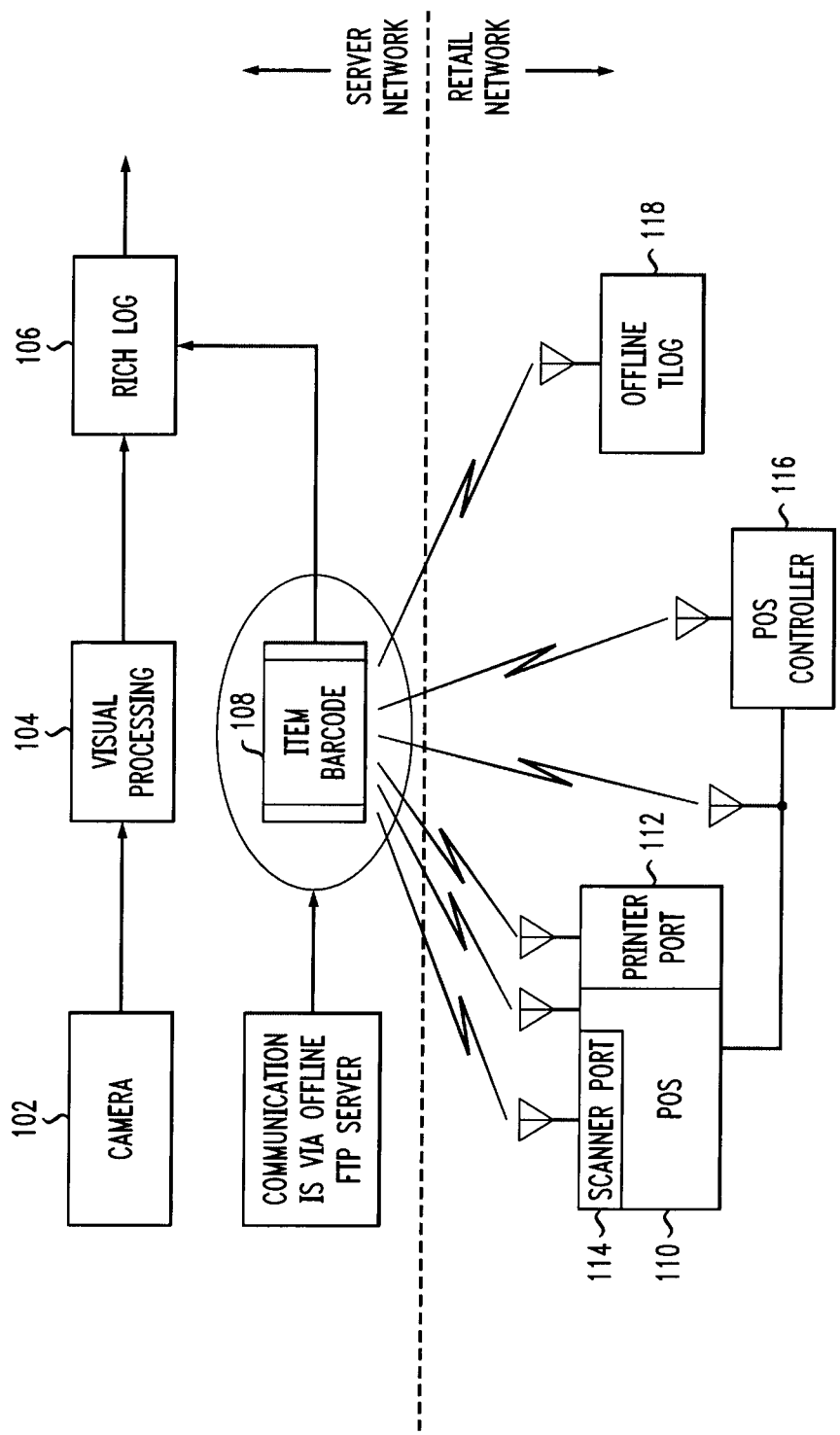
FIG. 1 is a diagram illustrating exemplary architecture, according to an embodiment of the present invention.

FIG. 1 is a diagram illustrating exemplary architecture, according to an embodiment of the present invention. By way of illustration, FIG. 1 depicts a server network and a retail network. The server network includes a camera 102, which feeds to visual processing in step 104, which, along with an item barcode 108, leads to a rich log 106. Also, item barcodes can be obtained from different points in the retail network such as, for example, getting TLOG from a point-of-sale's (POS's) scanner port 114, intercepting and extracting TLOG from the network between POS 110 (which includes a printer port 112) and POS controller 116, and obtaining TLOG from an offline TLOG data repository 118.

Within the context of an ordinary retail checkout environment, a number of processes can occur. For example, a shopper may enter a queue, wait, empty his or her cart/basket, present any pre-transaction material (for example, a loyalty card), scan items, pay for items and leave. Additionally, a cashier may, for example, seek or present identification, wait for the customer to empty his or her cart/basket, load the cash register, unload the cash register, count money, call another cashier, indicate that a lane is active or inactive, call a supervisor, void a transaction and/or item, take payment, seek payment and bag items for a customer. Further, a supervisor may, for example, override a situation.

Figure 2:
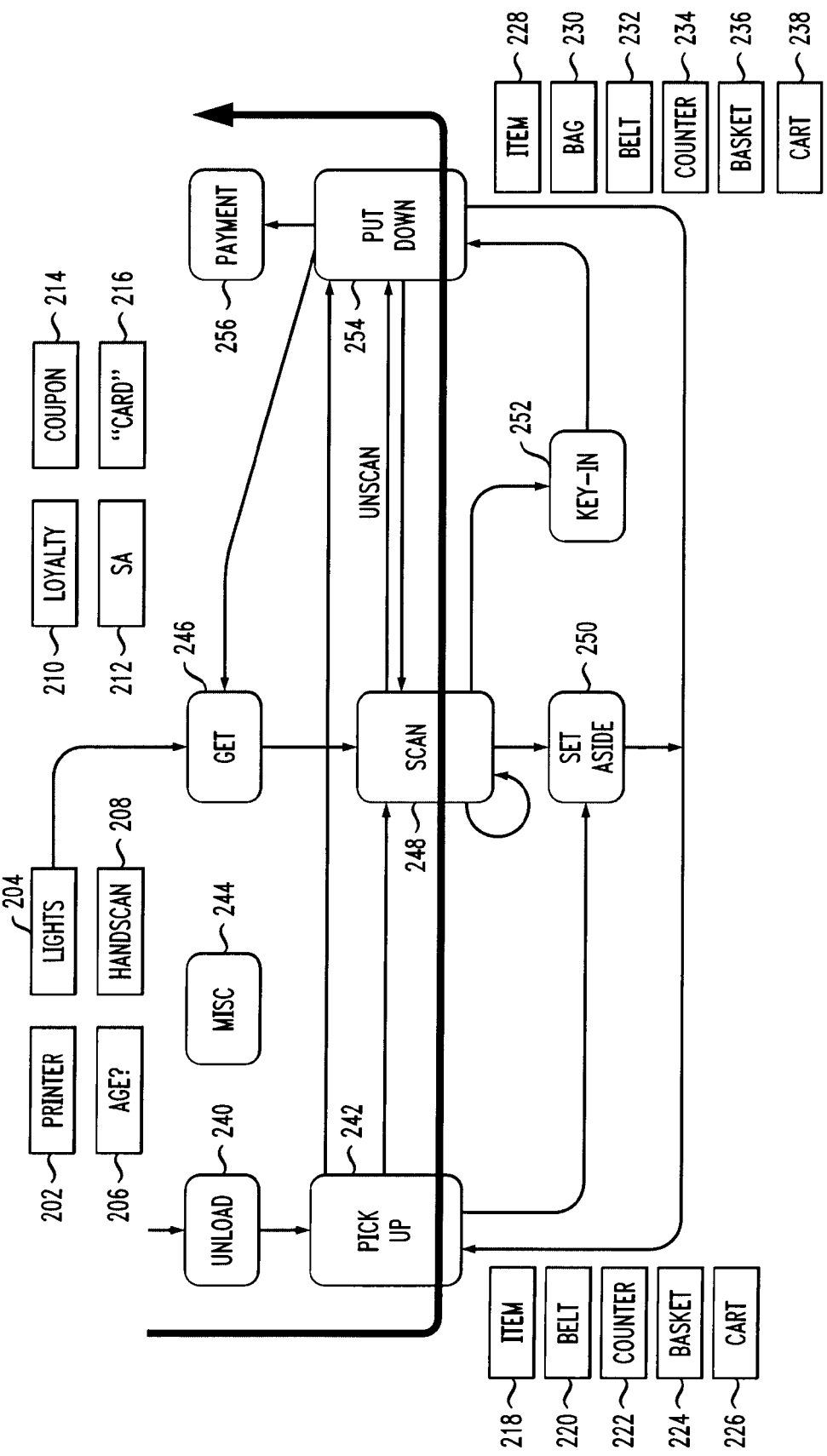
FIG. 2 is a diagram illustrating an exemplary retail checkout progression, according to an embodiment of the present invention.

FIG. 2 is a diagram illustrating an exemplary retail checkout progression, according to an embodiment of the present invention. By way of illustration, FIG. 2 depicts components such as a printer 202, lights 204, an age verification element 206, a hand-scan 208 and other miscellaneous elements 244 (for example, a hard-tag remover (often in apparel stores), a demagnetizer (high-end electronics stores), a radio-frequency identification (RFID) receiver, etc.). Also, at the beginning of the progression, a customer may unload in step 240 an item 218 onto a belt 220 or counter 222 from his or her basket 224 or cart 226, and a cashier or employee may pickup in step 242 the item 218 from the belt 220 or counter 220. The cashier or employee, at this stage, may also set aside an item in step 250.

Additionally, the cashier or employee, in step 246, may get a loyalty item 210, a shopper assistant (SA) card 212 (used, for example, in stores with self-checkout lanes), a coupon 214 and/or one or more types of cards 216 from the customer. The cashier or employee can also scan an item in step 248 and/or key-in information into the register in step 252. Further, in step 254, the cashier or employee can put down an item 228 onto a belt 232 or counter 234, and/or into a bag 230, a basket 236 and/or cart 238. Also, the cashier or employee can seek payment from the customer in step 256.

Figure 3:
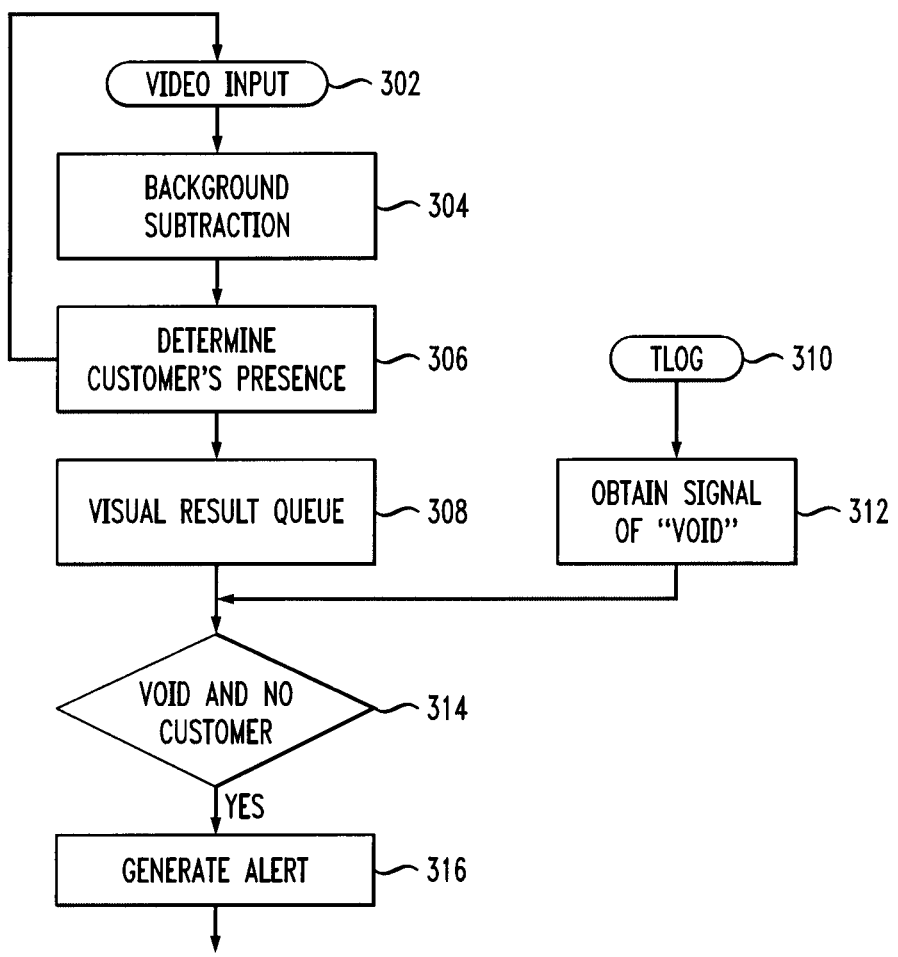
FIG. 3 is a flow diagram illustrating techniques to generate an alert to void a transaction without a required customer present, according to an embodiment of the present invention.

FIG. 3 is a flow diagram illustrating techniques to generate an alert to void a transaction without a required customer present, according to an embodiment of the present invention. Step 302 includes receiving video input. Step 304 includes subtracting background material. Background subtraction is used as an object and/or person detection mechanism, and it models the background in the surveillance video, which is usually static. Then, in the in-coming videos, if there is any inconsistency between the modeled background and the current image pixel values, then there is a moving object (or objects) present in the scene. One example is a red ball moving in front of a blue background. In this case, the background model is the color of "blue," and when the red ball moves into the camera field-of-view, its pixels possess different color comparing to the background. Thus, it will be detected as a foreground object. As such, the background is subtracted from the current image, and what is left is the foreground. One or more embodiments of the invention utilize its output for person presence analysis (as described in step 306), and execute background subtraction as an automated process.

Step 306 includes determining the presence of a customer. As described above, background subtraction techniques can be used for detecting the presence of a customer. One or more embodiments of the invention can also include detecting the presence of a person via fitting a person model that is previously learned (for example, template matching), analyzing motion patterns in the video (for example, optical flow clustering and analysis), and statistical learning (for example, probabilistic latent semantic analysis or cascaded machine learning). If the customer is present, then one can return to step 302.

Step 308 includes creating a visual result queue. The visual analytic engine performs the video image processing and information extraction tasks. Its output will be a queue containing the status of whether or not the customer region contains at least one customer or if the customer's region is empty. For example, within a period of five minutes, assume customer A is present at the check-out from minutes 0~2, and customer B is present from minute 4~5. As such, the resulting visual result queue would contain information like the following:

| | |
|---|---|
| [customer present | 00:00] |
| [customer absent | 00:02] |
| [customer present | 00:04] |

The entries in the queue usually are in an alternating order between "present" and "absent." The time stamps represent from what time point the presence/absence starts. The corresponding ending time stamp would be the starting time of the next entry.

Step 310 includes obtaining and/or reviewing a transaction log (TLOG) to match the transaction in question with the visual results. Step 312 includes obtaining a signal of "void," wherein the signal is obtained from the TLOG, for example, from any of the sources depicted in FIG. 1. Step 314 includes determining if a void signal has been obtained and if the customer is not present. If a void signal has been obtained and the customer is not present, then one or more embodiments of the invention generate an alert in step 316 indicating that information to a user.

Figure 4:
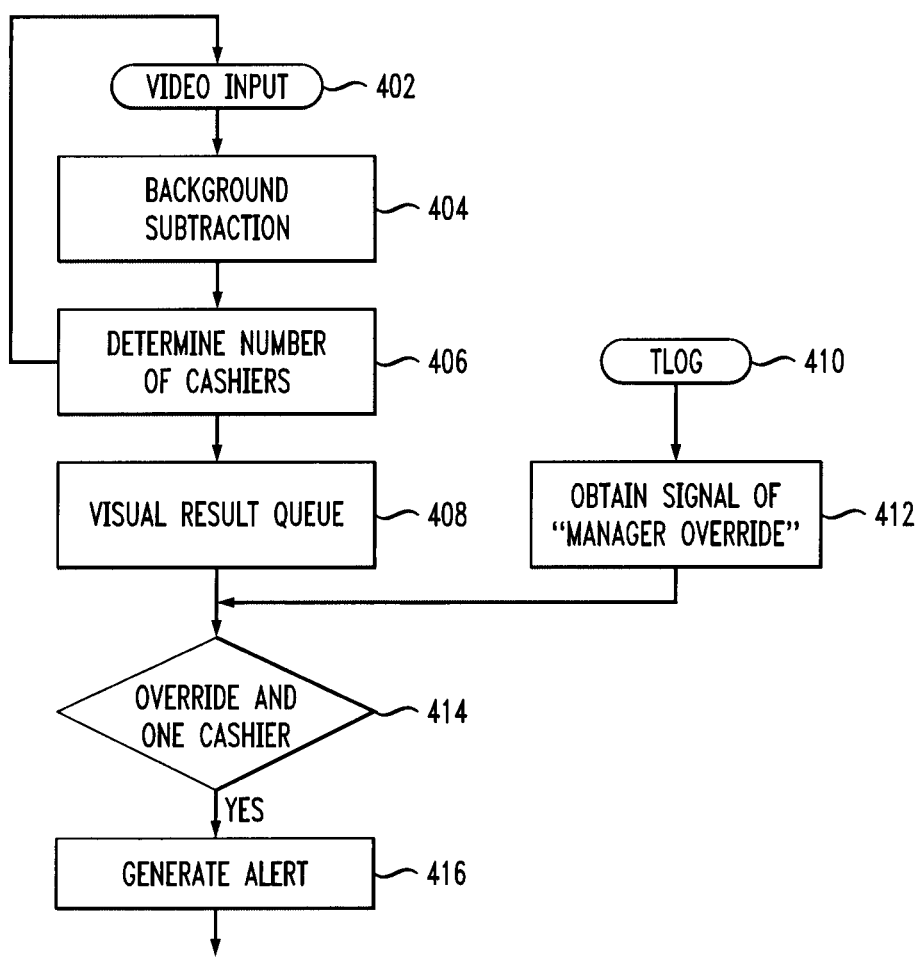
FIG. 4 is a flow diagram illustrating techniques to generate an alert to override a transaction, according to an embodiment of the present invention.

FIG. 4 is a flow diagram illustrating techniques to generate an alert to override a transaction, according to an embodiment of the present invention. Step 402 includes receiving video input. Step 404 includes subtracting background material (as described above in FIG. 3). Step 406 includes determining the number of cashiers. If the number of cashiers is commensurate to enterprise protocol, then one can return to step 402. Step 408 includes creating a visual result queue. In this case, the visual result queue contains similar but different information from that described in FIG. 3. An example could include the following:

| [cashier 2] | 00:01] |
|---|---|
| [cashier 1] | 00:05] |
| [cashier 0] | 00:10] |

In this example, the number of cashiers in the cashier's region is recorded along with their time stamps. Number "0" indicates that the cashier's region is empty. Entries in the queue can be compared to the "manager's override" TLOG for detecting potential frauds.

Step 410 includes obtaining and/or reviewing a TLOG to match the transaction in question with the visual results. Step 412 includes obtaining a signal of "manager override," wherein the signal is obtained from the TLOG, for example, from any of the sources depicted in FIG. 1. Step 414 includes determining if an override signal has been obtained and if there is only one cashier. If an override signal has been obtained and there is only one cashier, then one or more embodiments of the invention generate an alert in step 416 indicating that information to a user.

Figure 5:
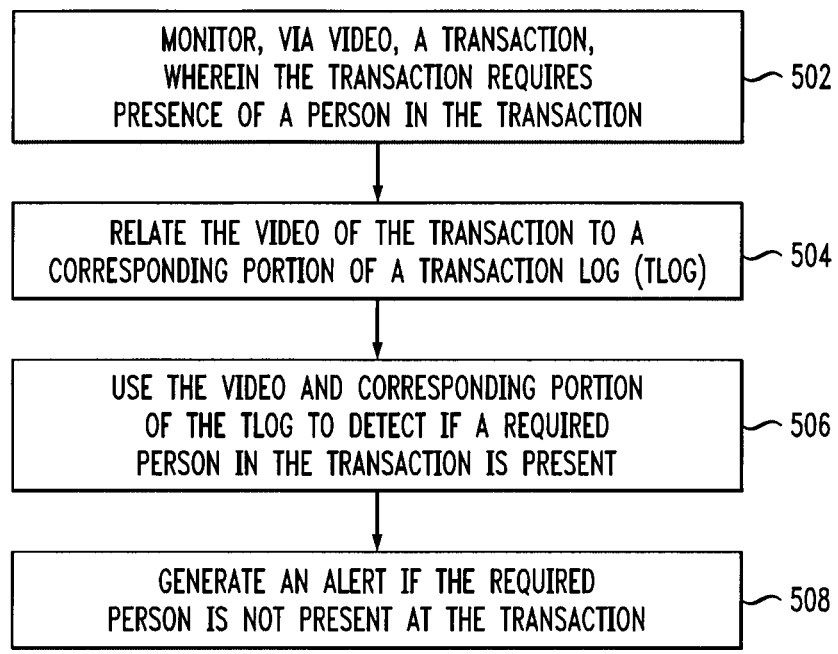
FIG. 5 is a flow diagram illustrating techniques for generating an alert based on absence of a given person in a transaction, according to an embodiment of the present invention.

FIG. 5 is a flow diagram illustrating techniques for generating an alert based on absence of a given person in a transaction (for example, a void, a refund and/or an override), according to an embodiment of the present invention. The transaction can include a retail transaction at a retail checkout. Step 502 includes monitoring, via video, a transaction, wherein the transaction includes presence of a given person (for example, requires the presence of a given person) in the transaction (for example, to authorize the transaction). Step 504 includes relating the video of the transaction to a corresponding portion of a transaction log (TLOG).

Step 506 includes using the video and corresponding portion of the TLOG to detect if the given person in the transaction is present. Detecting if a given person in the transaction is present can include, for example, using a model of checkout events and using a visual analytic engine to analyze the video of the transaction (at checkout). Also, detecting if a given person in the transaction is present can include using a visual analytic engine to detect one or more persons in the transaction. One can use a visual analytic engine to categorize each of the one or more persons as one of a shopper, a cashier, and a manager.

Additionally, step 508 includes generating an alert if the given person is not present at the transaction.

The techniques depicted in FIG. 5 can also include detecting a foreground object in the video of the transaction, as well as obtaining a signal from the TLOG that the transaction is a transaction that requires one or more specific people. Also, one or more embodiments of the invention include generating an alert if a mis-match between a visual result and the TLOG is detected.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 6:
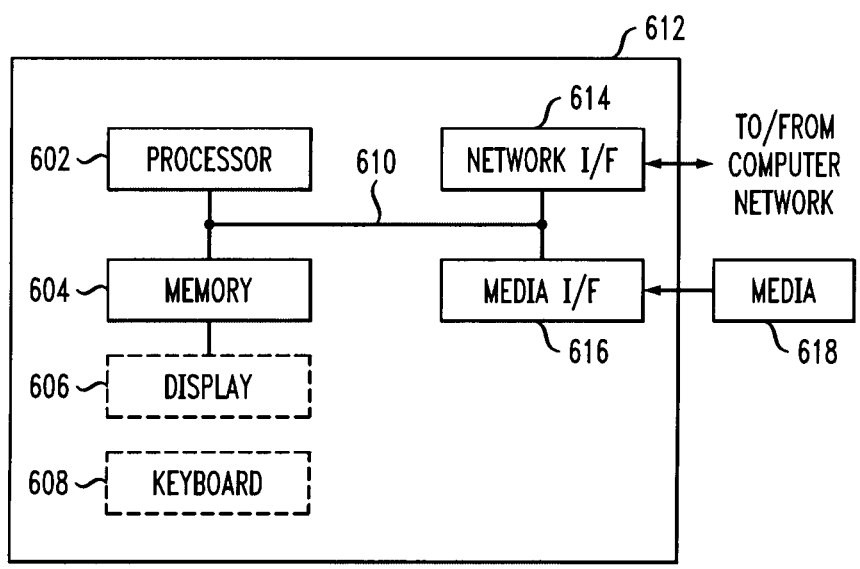
FIG. 6 is a system diagram of an exemplary computer system on which at least one embodiment of the present invention can be implemented.

At present, it is believed that the preferred implementation will make substantial use of software running on a general-purpose computer or workstation. With reference to FIG. 6, such an implementation might employ, for example, a processor 602, a memory 604, and an input and/or output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor.

The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 602, memory 604, and input and/or output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 618) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 604), magnetic tape, a removable computer diskette (for example, media 618), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, automatically relating video of a transaction to the corresponding portion the transaction log and, using video camera analysis, detecting if the required authorized people are present and creating annotation accordingly.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for generating an alert based on absence of a given person in a transaction, comprising the steps of:
    monitoring, via video from a camera, a transaction at an enterprise retail checkout;
    relating the video of the transaction to a corresponding portion of a transaction log to match a description of the transaction in question with the video of the transaction, wherein the transaction log includes a description of checkout events at the enterprise retail checkout and one or more specific people required by enterprise policy to be present in the transaction;
    comparing the video of the transaction and the description of the transaction from the corresponding portion of the transaction log to detect if the one or more specific people required by the enterprise policy in the description of the transaction is present in the video, wherein comparing the video of the transaction and the description of the transaction from the corresponding portion of the transaction log to detect if the one or more specific people required by the enterprise policy in the description of the transaction is present in the video is carried out by a visual analytic engine module executing on a hardware processor; and
    generating an alert if the one or more specific people required to be present by the enterprise policy are not present in the video of the transaction, wherein generating an alert is carried out by a module executing on a hardware processor.

2. The method of claim 1, wherein detecting if the given person in the transaction is present comprises:
    using a model of checkout events; and
    using a visual analytic engine to analyze the video of the transaction.

3. The method of claim 1, wherein the transaction comprises at least one of a void, a refund and an override.

4. The method of claim 1, wherein detecting if the given person in the transaction is present comprises using a visual analytic engine to detect one or more persons in the transaction.

5. The method of claim 4, further comprising using a visual analytic engine to categorize each of the one or more persons as one of a shopper, a cashier, and a manager.

6. The method of claim 1, wherein the transaction comprises a retail transaction at a retail checkout.

7. The method of claim 1, further comprising detecting a foreground object in the video of the transaction.

8. The method of claim 1, further comprising obtaining a signal from the transaction log that the transaction is a transaction that requires one or more specific people.

9. The method of claim 1, further comprising generating an alert if a mis-match between a visual result and the transaction log is detected.

10. A computer program product comprising a computer readable non-transitory medium having computer readable program code for generating an alert based on absence of a given person in a transaction, said computer program product including:
    computer readable program code for monitoring, via video from a camera, a transaction at an enterprise retail checkout;
    computer readable program code for relating the video of the transaction to a corresponding portion of a transaction log to match a description of the transaction in question with the video of the transaction, wherein the transaction log includes a description of checkout events at the enterprise retail checkout and one or more specific people required by enterprise policy to be present in the transaction;
    computer readable program code for comparing the video of the transaction and the description of the transaction from the corresponding portion of the transaction log to detect if the one or more specific people required by the enterprise policy in the description of the transaction is present in the video; and
    computer readable program code for generating an alert if the one or more specific people required to be present by the enterprise policy are not present in the video of the transaction.

11. The computer program product of claim 10, wherein the computer readable program code for detecting if the given person in the transaction is present comprises:
    computer readable program code for using a model of checkout model events; and
    computer readable program code for using a visual analytic engine to analyze the video of the transaction.

12. The computer program product of claim 10, wherein the computer readable program code for detecting if the given person in the transaction is present comprises computer readable program code for using a visual analytic engine to detect one or more persons in the transaction.

13. The computer program product of claim 12, further comprising computer readable program code for using a visual analytic engine to categorize each of the one or more persons as one of a shopper, a cashier, and a manager.

14. The computer program product of claim 10, further comprising computer readable program code for detecting a foreground object in the video of the transaction.

15. The computer program product of claim 10, further comprising computer readable program code for obtaining a signal from the transaction log that the transaction is a transaction that requires one or more specific people.

16. The computer program product of claim 10, further comprising computer readable program code for generating an alert if a mis-match between a visual result and the transaction log is detected.

17. The computer program product of claim 10, wherein the transaction comprises at least one of a void, a refund and an override.

18. A system for generating an alert based on absence of a given person in a transaction, comprising:
   a memory; and
   at least one processor coupled to said memory and operative to:
      monitor, via video from a camera, a transaction at an enterprise retail checkout;
      relate the video of the transaction to a corresponding portion of a transaction log to match a description of the transaction in question with the video of the transaction, wherein the transaction log includes a description of checkout events at the enterprise retail checkout and one or more specific people required by enterprise policy to be present in the transaction;
      compare the video of the transaction and the description of the transaction from the corresponding portion of the transaction log to detect if the one or more specific people required by the enterprise policy in the description of the transaction is present in the video; and
      generate an alert if the one or more specific people required to be present by the enterprise policy are not present in the video of the transaction.

19. The system of claim 18, wherein in detecting if the given person in the transaction is present the at least one processor coupled to said memory is further operative to:
   use a model of checkout model events; and
   use a visual analytic engine to analyze the video of the transaction.

20. The system of claim 18, wherein in detecting if the given person in the transaction is present the at least one processor coupled to said memory is further operative to use a visual analytic engine to detect one or more persons in the transaction.

21. The system of claim 20, wherein the at least one processor coupled to said memory is operative to use a visual analytic engine to categorize each of the one or more persons as one of a shopper, a cashier, and a manager.

22. The system of claim 18, wherein the at least one processor coupled to said memory is operative to detect a foreground object in the video of the transaction.

23. The system of claim 18, wherein the at least one processor coupled to said memory is operative to obtain a signal from the transaction log that the transaction is a transaction that requires one or more specific people.

24. The system of claim 18, wherein the at least one processor coupled to said memory is operative to generate an alert if a mis-match between a visual result and the transaction log is detected.

25. An apparatus for generating an alert based on absence of a given person in a transaction, said apparatus comprising:
   means for monitoring, via video from a camera, a transaction at an enterprise retail checkout;
   means for relating the video of the transaction to a corresponding portion of a transaction log to match a description of the transaction in question with the video of the transaction, wherein the transaction log includes a description of checkout events at the enterprise retail checkout and one or more specific people required by enterprise policy to be present in the transaction;
   means for comparing the video of the transaction and the description of the transaction from the corresponding portion of the transaction log to detect if the one or more specific people required by the enterprise policy in the description of the transaction is present in the video; and
   means for generating an alert if the one or more specific people required to be present by the enterprise policy are not present in the video of the transaction.

* * * * *